(12) United States Patent
Yu et al.

(10) Patent No.: US 10,329,170 B2
(45) Date of Patent: Jun. 25, 2019

(54) LIQUID PURIFICATION APPARATUS AND METHOD

(71) Applicants: Litao Yu, Shanghai (CN); Fenghua Wu, Shanghai (CN); Ruguo Hu, Ningbo (CN); Nestec S. A., Vevey (CH)

(72) Inventors: Litao Yu, Shanghai (CN); Fenghua Wu, Shanghai (CN); Ruguo Hu, Ningbo (CN)

(73) Assignee: Nestec S. A., Vevey (CH)

( * ) Notice: Subject to any disclaimer, the term of this patent is extended or adjusted under 35 U.S.C. 154(b) by 513 days.

(21) Appl. No.: 14/761,192

(22) PCT Filed: Jan. 22, 2013

(86) PCT No.: PCT/CN2013/070832
§ 371 (c)(1),
(2) Date: Jul. 15, 2015

(87) PCT Pub. No.: WO2014/113917
PCT Pub. Date: Jul. 31, 2014

(65) Prior Publication Data
US 2016/0009570 A1 Jan. 14, 2016

(51) Int. Cl.
*C02F 1/32* (2006.01)

(52) U.S. Cl.
CPC ........ *C02F 1/325* (2013.01); *C02F 2201/004* (2013.01); *C02F 2201/005* (2013.01); *C02F 2201/326* (2013.01); *C02F 2201/3222* (2013.01); *C02F 2201/3227* (2013.01); *C02F 2301/026* (2013.01); *C02F 2301/046* (2013.01); *C02F 2303/04* (2013.01); *C02F 2307/10* (2013.01)

(58) Field of Classification Search
CPC ................ C02F 1/325; C02F 2201/005; C02F 2201/004; C02F 2307/10; C02F 2303/04; C02F 2301/026; C02F 2201/326; C02F 2201/3227; C02F 2201/3222; C02F 2301/046
See application file for complete search history.

(56) References Cited

U.S. PATENT DOCUMENTS 3,550,782 A * 12/1970 Veloz ..................... B01D 61/08
                                                  210/192
4,969,991 A * 11/1990 Valadez ................. B01D 61/08
                                                  210/104

(Continued)

FOREIGN PATENT DOCUMENTS

CN      1720198 A      1/2006
CN      1842494 A     10/2006

(Continued)

OTHER PUBLICATIONS

English language machine translation of DE 102010005893 A1. (Year: 2011).*

(Continued)

*Primary Examiner* — David C Mellon
(74) *Attorney, Agent, or Firm* — Dunlap Codding, P.C.

(57) ABSTRACT

A liquid purification apparatus is disclosed, along with methods of producing and using same.

20 Claims, 4 Drawing Sheets

(56) References Cited

U.S. PATENT DOCUMENTS

| | | | | |
|---|---|---|---|---|
| 5,004,541 | A * | 4/1991 | Noll | A61L 2/10 210/251 |
| 5,417,852 | A * | 5/1995 | Furness, Jr. | B01J 19/2405 210/188 |
| 5,935,441 | A * | 8/1999 | O'Neill | C02F 1/32 210/638 |
| 6,235,191 | B1 * | 5/2001 | Nakamura | C02F 1/325 210/138 |
| 6,585,885 | B2 * | 7/2003 | Larkner | C02F 1/008 210/100 |
| 9,499,415 | B2 * | 11/2016 | Deguchi | C02F 1/325 |
| 2003/0052278 | A1 * | 3/2003 | Duarte | A61L 2/0011 250/438 |
| 2005/0000913 | A1 * | 1/2005 | Betterly | C02F 1/325 210/748.11 |
| 2005/0025684 | A1 * | 2/2005 | Jethrow | A61L 2/022 422/292 |
| 2006/0006104 | A1 | 1/2006 | Cary et al. | |
| 2008/0305018 | A1 * | 12/2008 | Blum | A23L 3/28 422/186.3 |
| 2008/0315116 | A1 * | 12/2008 | Schweitzer | C02F 1/325 250/436 |
| 2010/0133155 | A1 * | 6/2010 | Nolan | C02F 1/006 210/98 |
| 2012/0043269 | A1 * | 2/2012 | Shariff | C02F 1/00 210/181 |
| 2017/0166458 | A1 * | 6/2017 | Rimbault | A23L 3/28 |

FOREIGN PATENT DOCUMENTS

| | | | |
|---|---|---|---|
| CN | 201538708 U | 8/2010 | |
| DE | 102010005893 A1 * | 7/2011 | C02F 1/325 |
| DE | 102011017455 A1 | 10/2012 | |
| JP | 6218393 A | 9/1994 | |

OTHER PUBLICATIONS

EP138722897; Yu, et al.; Office Action dated Aug. 10, 2016.
EP138722897; Yu, et al.; Supplementary European Search Report dated Aug. 10, 2016.
International Search Report, dated Oct. 31, 2013, in PCT/CN2013/070832, filed Jan. 22, 2013.
Written Opinion of the International Search Report, dated Oct. 31, 2013, in PCT/CN2013/070832, filed Jan. 22, 2013.

* cited by examiner

LIQUID PURIFICATION APPARATUS AND METHOD

CROSS REFERENCE TO RELATED APPLICATIONS/INCORPORATION BY REFERENCE STATEMENT

This application is a U.S. national stage application filed under 35 USC § 371 of International Application No. PCT/CN2013/070832, filed Jan. 22, 2013. The entire contents of the above-referenced application are hereby expressly incorporated herein by reference.

BACKGROUND

The presently disclosed and/or claimed inventive concept(s) relates generally to a liquid purification apparatus. The presently disclosed and/or claimed inventive concept(s) also relates to a method for purifying a volume of liquid with such an apparatus, as well as a beverage dispenser comprising it. The presently disclosed and/or claimed inventive concept(s) also relates to an irradiation device as such.

One of the most essential tasks in purifying water for drinking is disinfection, so as to ensure that any pathogenic microorganisms (e.g. bacteria, viruses, and/or protozoans) present in the water cannot cause illness in anyone who drinks it. It is known to perform this disinfection by the process of ultraviolet (UV) irradiation, where a volume of water being treated is bombarded with high-energy UV radiation. The UV radiation damages the DNA and RNA of the pathogenic microorganisms, destroying their ability to reproduce and effectively neutralizing their ability to cause disease.

Since such systems utilize light to disinfect, their effectiveness is reduced on liquid which is not naturally clear or which has not been filtered to remove suspended solids. The scope of "purification," for the purposes of this document, should thus be understood as encompassing the disinfection of liquid in which turbidity is minimal.

Traditional UV liquid purification systems have employed gas-discharge lamps as UV sources, in particular mercury-vapor lamps. Recently, it has become more and more common to employ ultraviolet light-emitting diodes (UV-LEDs) as a source of ultraviolet light for irradiation. UV-LEDs have numerous advantageous aspects which makes them appealing for use in an ultraviolet liquid purification system, notably their compact size, robustness, and lack of toxic components such as the mercury vapor found in conventional lamps. The solid-state nature of UV-LEDs also enables them to be switched on and off instantly, a further advantage relative to conventional gas-discharge lamps.

There are several examples in the prior art of UV-LEDs being employed to purify a liquid by ultraviolet irradiation. For example, the document CN 202175579 describes an irradiation device in which a single tube is spiraled around an array of UV-LEDs, and the document KR 20110007554 describes a faucet with a built-in UV-LED sterilizer for treating the liquid issuing from it. In addition, the document KR 20040073732 describes a system for purifying water that is drawn from a reservoir and conducted through a sterilizer directly to a nozzle for dispensing.

However, the liquid purification systems known in the art are disadvantageous in several ways. Unlike chemical water purification means such as chlorine or ozone, ultraviolet sterilization does not have any persistent effect; liquid which has been sterilized is thus more susceptible to being re-contaminated. In the purification systems known in the art, there is a section of plumbing, generally located between the ultraviolet irradiator to an outlet of the apparatus, where water is not circulated except during the dispensing of liquid from the machine. This segment of dead space within the system gives space where pathogenic microorganisms may potentially flourish without being exposed to ultraviolet irradiation.

In the systems known in the art, this problem is solved by disposing a second irradiation device in or near the outlet itself. The liquid flowing from the spout is thus effectively irradiated twice: once by a full-power irradiation device within the machine, and once by another full-power irradiation device disposed within the spout. Since each of the irradiation devices must be sufficiently powerful to properly disinfect the liquid by itself, the cost of the apparatus and the energy required for its operation are increased. Furthermore, since the second irradiation device is disposed within the spout it is in close proximity to the opening through which the liquid is dispensed, requiring extra care and expense in providing protection to the user from exposure to the ultraviolet light generated during the dispensing of the purified liquid.

The presently disclosed and/or claimed inventive concept(s) seeks to provide a system for purifying a liquid by ultraviolet germicidal irradiation with an improved effectiveness and reduced energy consumption relative to those known in the art.

BRIEF DESCRIPTIONS OF THE VIEWS OF THE DRAWINGS

Other particularities and advantages of the presently disclosed and/or claimed inventive concept(s) will also emerge from the following description.

In the accompanying drawings, given by way of non-limiting examples:

DETAILED DESCRIPTION

Figure 1:
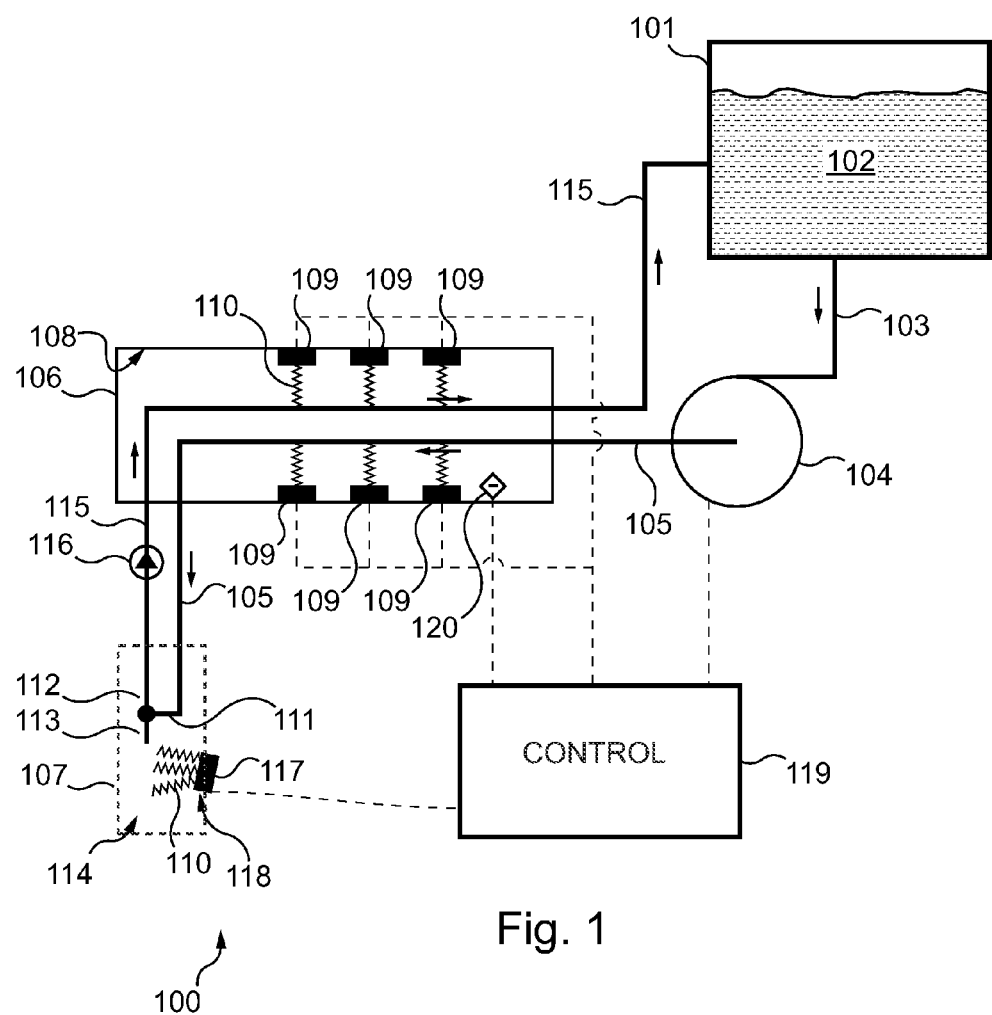
FIG. 1 is a schematic depiction of a liquid purification apparatus, according to a first embodiment.

According, therefore, to a first non-limiting embodiment, the presently disclosed and/or claimed inventive concept(s) is drawn to a liquid purification apparatus, comprising a reservoir configured to accommodate a volume of liquid; a pump disposed in fluid communication with said reservoir; and a primary irradiation device, said primary irradiation device being provided with ultraviolet light-emitting means, such as but not limited to, a plurality of ultraviolet light-emitting diodes.

According to a non-limiting embodiment of the presently disclosed and/or claimed inventive concept(s), the liquid purification apparatus is characterized in that it further comprises: a directional valve, said directional valve comprising an input port, a recirculation port, and a sealing means, said directional valve being mobile between a recirculating position wherein said sealing means blocks a discharge port and a discharging position wherein said directional valve permits a flow from said input port through said discharge port and out of the liquid purification apparatus; a first circulation tube, said first circulation tube establishing fluid communication between said pump and said input port of said directional valve; and a second circulation tube, said second circulation tube establishing fluid communication between said recirculation port of said directional valve and said reservoir;

wherein when said directional valve is in the recirculating position, said reservoir, pump, first circulation tube, directional valve, and second circulation tube form a closed loop and, wherein said first circulation tube and/or second circulation tube comprises a portion substantially transparent to ultraviolet light and disposed within the primary irradiation device.

This is advantageous in that substantially the entire volume of liquid disposed within the apparatus is circulated through and purified by the primary irradiation device when the apparatus is in operation. This eliminates any dead-space segments (e.g. dead corners) from the apparatus where liquid is present but not circulating, thereby substantially preventing the multiplication of pathogenic microorganisms in the liquid. It also prevents the re-contamination of the whole system. The liquid purification apparatus is thus rendered more effective.

This is also advantageous in that the liquid purification apparatus according to this aspect will consume less energy in its operation than those known in the art. Since the liquid is recirculated through the primary irradiation device, the primary irradiation device need not be as powerful as those utilized in the systems known in the art. By recirculating the liquid through the primary irradiation device when liquid is not being discharged from the liquid purification apparatus, the apparatus will consume less energy in purifying that volume of liquid than if it were purified in a single, high-intensity dose during its discharge from the machine, as in the systems known in the art.

Furthermore, since the dead space is eliminated from the apparatus, the need to provide a full-power irradiation device at an outlet of the liquid purification apparatus is eliminated. The cost of the apparatus and the energy consumed in its operation are thereby reduced. Since there is no full-power irradiation device disposed at an outlet, the need to provide means for protecting the user from ultraviolet irradiation leakage at the outlet is limited, reducing the complexity of the construction of the apparatus and increasing the flexibility with which it may be employed.

In a particular, non-limiting embodiment, the first circulation tube comprises a portion substantially transparent to ultraviolet light and disposed within the primary irradiation device. In addition, the second circulation tube comprises a portion substantially transparent to ultraviolet light and disposed within the primary irradiation device. Therefore, the same irradiation device is arranged to irradiate the liquid as it circulates to and from the directional valve. The advantage is an improved efficiency and significant energy saving.

According to a feature, the liquid purification apparatus further comprises a secondary irradiation device provided with at least one ultraviolet light-emitting diode which projects upon at least part of said directional valve.

In a possible configuration, said secondary irradiation device projects upon said discharge port of said directional valve. In another possible configuration, said secondary irradiation device projects upon said sealing means.

This is advantageous in that the part of the directional valve upon which the UV-LED projects is sterilized while minimizing the energy consumed in doing so. By disposing a secondary sterilization device projecting upon at least part of the directional valve, one will sterilize the parts of the directional valve which are not part of the closed loop within the liquid purification apparatus, but where it is nonetheless desirable to maintain sterility and reduce the chance of re-contamination. Furthermore, since said parts of the directional valve are not part of the closed loop, the secondary irradiation device need not be capable of sterilizing the liquid by itself and will thus use less power than the primary irradiation device. The energy consumed in the liquid purification apparatus is thereby reduced relative to the apparatuses found in the prior art.

According to another feature, the portions of said first and second circulation tubes which are disposed within said primary irradiation device are configured in a double helix. The configuration in double helix means that the first and second circulation tubes are arranged helically in substantially the same direction or possibly in opposite direction. In a particular, non-limiting embodiment, the arrangement of the two tubes is in the same direction. In another non-limiting arrangement, the first and second circulation tubes are arranged in opposite direction very much like a DNA double strand. However, such opposite configuration is less preferred as it occupies much more room and comparatively offers lower efficiency.

This is advantageous in that a helical structure will place a great length of the circulation tube within the primary irradiation device, thereby increasing its effectiveness. Furthermore, in providing the first and second circulation tubes in a double helix, the liquid being circulated through the apparatus will pass through the primary irradiation device two times for each circuit around the closed loop, doubling the amount of irradiation that the volume of liquid receives during the operation of the liquid purification apparatus. The efficiency of the primary irradiation device is thereby increased while simultaneously rendering it more compact.

According to another feature, the portions of said first and second circulation tubes have different diameters in the irradiation device.

This is advantageous in that providing one circulation tube smaller than the other will improve the exposure to a liquid flowing in the tubes to ultraviolet light being projected upon them, increasing the surface area of the tubes which is irradiated directly by any particular source. The irradiation of the liquid flowing through the tubes is thereby improved while reducing the amount of energy wasted in reflective and other losses.

According to still another feature, said primary irradiation device comprises a substantially cylindrical core disposed concentrically within a substantially tubular jacket, said first and second circulation tubes passing through said primary irradiation device between said core and said jacket.

This is advantageous in that a primary irradiation device so configured will concentrate the ultraviolet light emitted by the light-emitting diodes upon the circulation tubes disposed therein. In particular, the cylindrical shape of the core and jacket and the disposition of the circulating tubes between them will maximize the proportion of light emitted by the light-emitting diodes which is absorbed by the liquid within the circulation tubes. The effectiveness and energy-efficiency of the liquid purification apparatus is thereby improved.

In a possible embodiment, said core is configured as a reflector and said plurality of ultraviolet light-emitting diodes are disposed upon an internal surface of said jacket.

This is advantageous in that the number of ultraviolet light-emitting diodes is maximized for a primary irradiation device of a given size. As the jacket comprises the outer structure of the primary irradiation device, the surface area of its internal surface will necessarily be greater than any other internal surface within the primary irradiation device, maximizing the quantity of UV-LEDs disposed within the primary irradiation device and thus maximizing the intensity with which it irradiates the liquid being passed through it. The liquid purification capability of the apparatus is thereby maximized.

In another possible embodiment an internal surface of said jacket is configured as a reflector and said plurality of ultraviolet light-emitting diodes are disposed upon said core.

This is advantageous in that it minimizes the number of ultraviolet light-emitting diodes that must be employed to provide even irradiation of the circulation tubes and the liquid therein. The power consumption of the liquid purification apparatus is thereby minimized for a given degree of purification capacity.

According to another feature, said first and second circulation tubes are at least partially fabricated from fused silica.

This is advantageous in that fused silica is highly transparent to light in ultraviolet wavelengths. The amount of energy lost in the transmission of the ultraviolet light through the circulation tubes is thereby minimized, maximizing the performance and efficiency of the liquid purification apparatus.

According to still another feature, said primary irradiation device comprises a photosensor.

This is advantageous in that a photosensor will measure the intensity of the light emitted by the ultraviolet light-emitting diodes within the primary irradiation device. The photosensor is ideally used in a control system to calibrate the output of the ultraviolet light-emitting diodes to achieve optimal liquid purification. Furthermore, the provision of the photosensor enables monitoring of the operation of the liquid purification apparatus, such as adjusting the output of the ultraviolet light-emitting diodes to compensate for decreases in their output over their service life, or acting as a safety shut-off in the case of malfunction. The reliability and efficiency of the liquid purification apparatus is thereby maximized.

According to still another feature, the liquid purification apparatus further comprises a check valve disposed in said second circulation tube, said check valve preventing the flow of liquid from said reservoir to said directional valve through said second circulation tube.

This is advantageous in that the check valve will preserve the unidirectional nature of the closed loop, ensuring that the liquid within the circulating tubes cannot flow backwards and result in the re-contamination of previously purified liquid. The effectiveness of the apparatus is thereby improved.

According to a second non-limiting embodiment, the presently disclosed and/or claimed inventive concept(s) is directed to a method for purifying a volume of liquid with a liquid purification apparatus comprising a reservoir configured to accommodate a volume of liquid and a directional valve comprising an input port, a recirculation port, and a sealing means being mobile between a recirculating position wherein said directional valve blocks a discharge port, and a discharging position wherein said directional valve permits a flow from said input port through said discharge port; wherein the method comprises the steps of: drawing said volume of liquid from said reservoir by a pump and conducting it to said directional valve through a first circulation tube establishing fluid communication between said pump and said input port of said directional valve; conducting said volume of liquid to said reservoir through a second circulation tube establishing fluid communication between said recirculation port of said directional valve; a portion of said first circulation tube and/or second circulation tube being substantially transparent to ultraviolet light and being disposed within a primary irradiation device comprising light emitting means, such as but not limited to, ultraviolet light emitting diodes, the liquid being thus irradiated; maintaining said directional valve in said recirculating position such that said volume of liquid is sequentially recirculated along a closed loop comprising the reservoir, the pump, the first circulation tube, the directional valve, and the second circulation tube until a discharging step; and discharging said liquid from said discharge port by disposing said directional valve in said discharging position such that said liquid is directed from said first circulation tube to said discharge port.

This is advantageous in that purifying a liquid by this method will realize the advantages of the liquid purification apparatus described above. In particular, this method will purify the liquid more effectively while consuming less energy than the methods known in the prior art.

In a possible implementation, said volume of liquid is continuously recirculated through said liquid purification apparatus.

This is advantageous in that by continuously recirculating the volume of liquid, a portion of it is being irradiated at any given time. The liquid is thereby provided a rigorous protection against re-contamination, thus improving the reliability of the method.

In another possible implementation, said volume of liquid is periodically recirculated through said liquid purification apparatus for a finite duration of recirculation.

This is advantageous in that it will minimize the amount of energy required to purify a volume of liquid and maintain it in a purified state. The liquid is recirculated and irradiated only as often as is necessary to maintain its purified state, thereby maximizing the efficiency of the implementation of the method.

In still another possible implementation, there is provided a secondary irradiation device comprising at least one ultraviolet light-emitting diode projecting upon at least part of said directional valve, and in that during said discharging step said secondary irradiation device irradiates part of said directional valve.

Alternately, there is provided a secondary irradiation device comprising at least one ultraviolet light-emitting diode projecting upon at least part of said directional valve, and in that during said maintaining step said secondary irradiation device irradiates part of said directional valve.

This is advantageous in that the secondary irradiation device will project upon a portion of the directional valve which is not part of the closed loop, but where it is nonetheless desirable to maintain sterility, as discussed above.

According to a third non-limiting embodiment, the presently disclosed and/or claimed inventive concept(s) is directed towards a beverage dispenser comprising a liquid purification apparatus according to the above description.

This is advantageous in that a beverage dispenser so configured will realize the advantages of the liquid purification apparatus as described above in the preparation of beverages.

According to a fourth non-limiting embodiment, the presently disclosed and/or claimed inventive concept(s) is directed towards a beverage dispenser performing a method according to the above description.

This is advantageous in that a beverage dispenser operating in such a fashion will realize the advantages of the method as described above.

According to another non-limiting embodiment, the presently disclosed and/or claimed inventive concept(s) is directed towards an irradiation device for a liquid purification apparatus comprising: an outer jacket and a core within it, defining a void space between the jacket and the core, a first circulation tube substantially transparent to ultraviolet light and arranged in helical configuration in the void space; a plurality of ultraviolet light emitting diodes projected into the void space; wherein it further comprises a second circulation tube substantially transparent to ultraviolet light and arranged in helical configuration in the void space.

This is advantageous in that the irradiation device so configured is able to provide an increased effectiveness and allows a larger volume of liquid to be irradiated in a minimized overall room occupied by the device. The device also concentrates the ultraviolet light emitted by the light-emitting diodes upon the circulation tubes disposed therein. In particular, the cylindrical shape of the core and jacket and the disposition of the circulating tubes between them will maximize the proportion of light emitted by the light-emitting diodes which is absorbed by the liquid within the circulation tubes. The effectiveness and energy-efficiency of the liquid purification apparatus is thereby improved.

In a particular, non-limiting embodiment, the first and second circulation tubes are arranged in double helix of the same direction. This is advantageous in that a helical structure will place a great length of the circulation tube within the irradiation device, thereby increasing its effectiveness. In another possible mode, the first and second circulation tubes are arranged in double helix of opposite directions.

The plurality of ultraviolet light emitting diodes is also preferably disposed on the interior surface of the jacket and/or on the outer surface of the core to project into the void space. Furthermore, the interior surface of the jacket and/or the outer surface of the core are highly reflective to the light emitted by the ultraviolet diodes.

This is advantageous in that the intensity of light emitted by the diodes is maximized inside the void space. The liquid purification capability of the apparatus is thereby maximized.

The circulation tubes are also (in a particular, non-limiting embodiment) at least partially fabricated from fused silica. This is advantageous in that fused silica is highly transparent to light in ultraviolet wavelengths. The amount of energy lost in the transmission of the ultraviolet light through the circulation tubes is thereby minimized, maximizing the performance and efficiency of the liquid purification apparatus.

The irradiation device may further comprise a photosensor to measure the intensity of the light emitted by the ultraviolet light-emitting diodes.

In another non-limiting embodiment, the presently disclosed and/or claimed inventive concept(s) further relates to a liquid purification apparatus comprising an irradiation device as aforementioned.

In another non-limiting embodiment, the presently disclosed and/or claimed inventive concept(s) further relates to a beverage dispenser comprising an irradiation device as aforementioned.

Turning now to the Drawings, FIG. 1 is a schematic depiction of a liquid purification apparatus 100 according to a first embodiment. The liquid purification apparatus 100 is provided a reservoir 101 which contains a volume of liquid 102. In this embodiment the liquid 102 is water, but may optionally be any liquid of sufficient transparency. The liquid 102 is drawn from the reservoir 101 through the pump tube 103 and into the pump 104. From the pump 104, the liquid 102 is conducted into the first circulation tube 105.

The first circulation tube 105 extends from the pump 104 through the primary irradiation device 106, as shown, establishing fluid communication between the pump 104 and the directional valve 107. The primary irradiation device 106 is in this embodiment a tubular structure, with an internal surface 108. The internal surface 108 is reflective, being fabricated (in a particular, non-limiting embodiment) from a highly-polished metal or alternately covered with a reflective metal foil.

A plurality of primary ultraviolet light-emitting diodes (UV-LEDs) 109 is provided upon the interior surface 108 of said primary irradiation device 106 so that they project the ultraviolet radiation 110 on said first circulation tube 105. In a particular, non-limiting embodiment, it may be desired that the first circulation tube 105 be substantially transparent to ultraviolet radiation at least over the portion which is disposed within the primary irradiation device 106. The liquid 102 within the first circulation tube 105 will be thus irradiated as it passes through the primary irradiation device 106.

The directional valve 107 comprises an input port 111 to which the first circulation tube 105 is connected, a recirculation port 112, and a discharge port 113. The directional valve 107 is biased to be disposed in a recirculating position such that the liquid 102 flows from the input port 111 to the recirculation port 112, but may be switched to a discharging position where the liquid 102 flows instead to the discharge port 113 and is discharged from the apparatus 100, in this embodiment through an orifice 114.

The second circulation tube 115 is in fluid communication with the recirculation port 112 of the directional valve 107, extending from the directional valve 107 through the primary irradiation device 106 and returning to the reservoir 101. As with the first circulation tube 105, the second circulation tube 115 is transparent to ultraviolet light at least over the portion which is disposed within the primary irradiation device 106, thereby resulting in the irradiation of the liquid 102 in the second circulation tube 115 as it passes through the primary irradiation device 106.

Thus, when the directional valve 107 is disposed in the recirculating position the liquid 102 will flow from the reservoir 101 through the pump tube 103 and pump 104, pass through the primary irradiation device 106 within the first circulation tube 105 where it is irradiated, from the input port 111 of the directional valve 106 to the recirculation port 112, through the primary irradiation device 106 through the second circulation tube 115 where it is irradiated a second time, and then returns to the reservoir 101. When the directional valve 107 is disposed in the discharging position, the liquid will flow from the input port 111 to the discharge port 113 instead of the recirculation port 112 and be discharged from the apparatus 100.

In a particular, non-limiting embodiment, there is disposed in the second circulation tube 115 a check valve 116, which permits flow of the liquid 102 through the apparatus 100 only in the direction described above.

In the present embodiment the first and second circulation tubes 105 and 115 are fabricated from fused silica. It should be understood, however, that other materials such as glasses, ceramics, mineral crystals, or plastics may be employed. In a particular, non-limiting embodiment, it may be desirable that, whatever the material employed, the first and second circulation tubes 105 and 106 are as transparent as possible to light in the ultraviolet wavelengths.

In this embodiment, the directional valve 107 is further provided with a secondary irradiation device 117 comprising at least one secondary UV-LED 118. The secondary irradiation device 117 projects ultraviolet rays 110 on the discharge port 113 and the interior of the orifice 114, sterilizing the portion of the directional valve which is not within the fluid circuit described above.

It should be noted that the primary and secondary UV-LEDs 109 and 118 may be configured such that the output of each UV-LED 109, 118 is the same as each other, or alternately to vary from one UV-LED 109, 118 to another. The exact output and number of UV-LEDs 109, 118 disposed in the primary and secondary irradiation devices 106 and 117 may vary according to the particular characteristics of the apparatus 100 and the application in which it is to be employed.

The apparatus 100 further comprises a control means 119, which is configured to electrically control the operation of the primary and secondary irradiation means 106 and 117 and the pump 104. In a particular, non-limiting embodiment, the control means 119 also communicates with a photosensor 120 disposed within the primary irradiation device 106. The control means 119 uses the output of the photosensor 120 to calibrate the intensity of the ultraviolet radiation 110 emitted from the primary UV-LEDs 109, as well as to monitor the operation of the apparatus 100 and warn the user of any malfunctions.

The control means 119 may be configured to constantly recirculate and irradiate the liquid 102. However, in a particular, non-limiting embodiment, the pump 104, primary irradiation device 106, and secondary irradiation device 117 are activated once for a pre-determined period of time to sterilize the liquid 102 when it is initially decanted into the reservoir 101, then periodically re-activated so as to maintain the sterility of the liquid 102 when it is being stored. The length and frequency of such cycles will depend on the aspects of each particular implementation, such as the overall volume of liquid 102, the output of the primary and secondary irradiation devices 106 and 117, and the environment in which the apparatus 100 is used.

It should be understood that while the control means 119 may be a simple array of timers, relays, and/or other electromechanical devices, in certain non-limiting embodiments, it may be desirable that the control means 119 is configured as a programmable "smart" control device which automatically activates the apparatus 100 so as to achieve optimal liquid purification. Further, while the apparatus discussed herein employs a photosensor 120, it should be understood that an apparatus 100 may be configured with other sensors (e.g. flow meters, water clarity sensors, thermocouples, etc.) which communicate with the control means 119 and which permit it to continually adjust the parameters of the operation of the liquid purification means. The exact configuration and program of operation of the control means 119 will thus vary according to the application in which the liquid purification device is to be employed.

Figure 2:
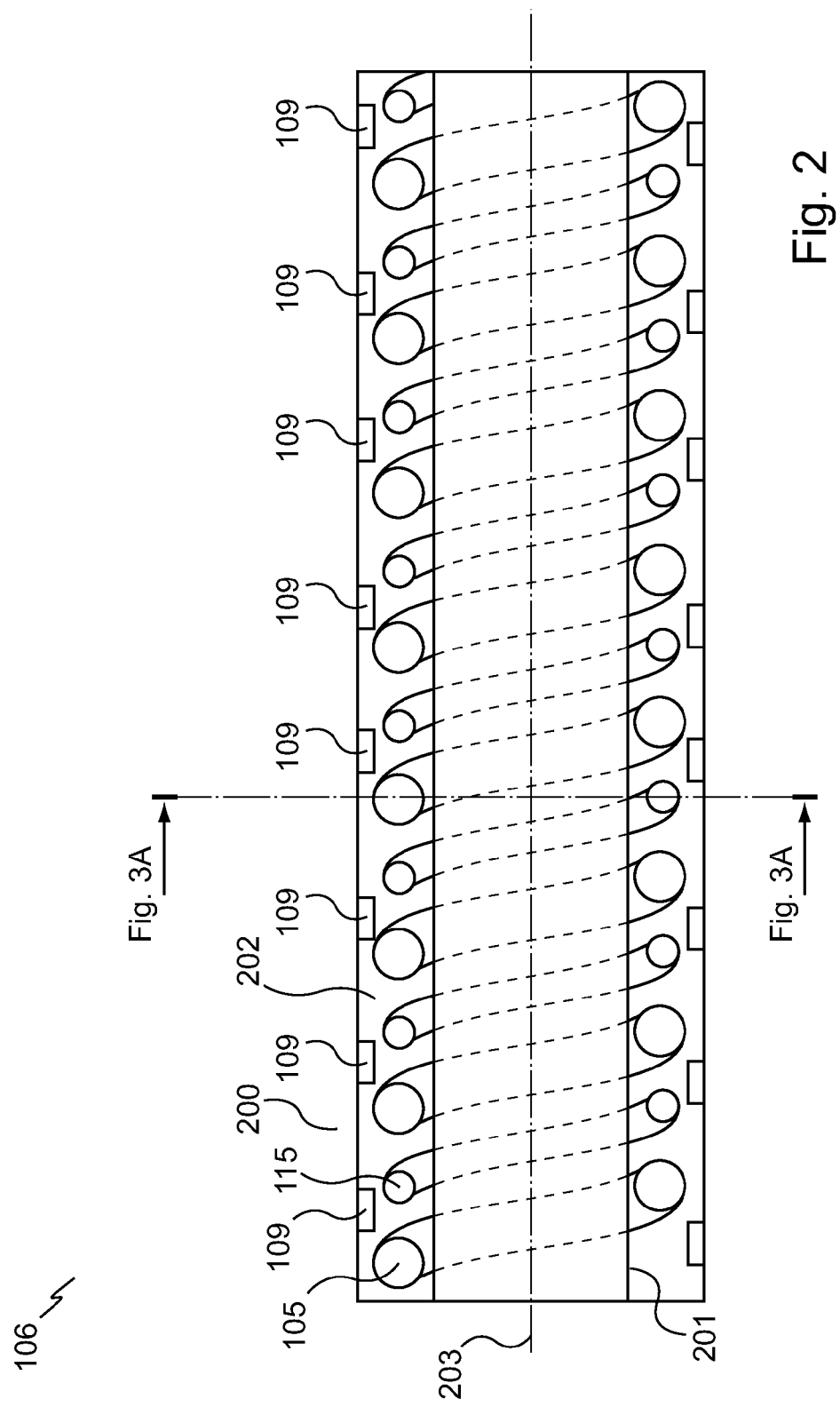
FIG. 2 is a longitudinal section view of a primary irradiation device according to a first embodiment.

FIG. 2 is a longitudinal section view of a primary irradiation device 106 according to the first embodiment. The primary irradiation device 106 comprises a substantially cylindrical outer jacket 200 and a substantially cylindrical core 201 within it, defining a void space 202 between the two. Within the void space are disposed the first and second circulation tubes 105 and 115, configured in a double-helix arrangement so as to wrap about the core 201, the outer jacket 200, core 201 and first and second circulation tubes 105 and 115 being thus disposed substantially concentrically about the longitudinal axis 203 of the primary irradiation device 106.

Upon the interior surface of the jacket 200 are disposed a plurality of primary UV-LEDs 109, positioned at regular intervals and projecting into the void space 202 of the primary irradiation device 106. The surfaces of the outer jacket 200 and core 201 are made to be highly reflective, such that as much of the ultraviolet light emitted by the primary UV-LEDs 109 is incident upon the first and second circulation tubes 105 and 115 as possible. The first circulation tube 105 also has a larger diameter than the second circulation tube 115, further improving the efficiency of the primary irradiation device 106.

While in this embodiment the primary irradiation device is configured as a circle, it may in some cases be advantageous to configure the core and outer jacket in other shapes. For instance, the core and outer jacket may have a cross-section in a polygonal form; configured as a composite of parabolas, hyperbolas, or complex curves, or any other regular or irregular combination of surfaces. Furthermore, the first and second circulation tubes may be provided in forms other than that of a double helix, e.g. as a plurality of longitudinally-oriented tubes connected at each end of the primary irradiation device by a manifold. It should therefore be understood that one skilled in the art will be able to configure the primary irradiation device for optimal performance in any particular application.

Figure 3:
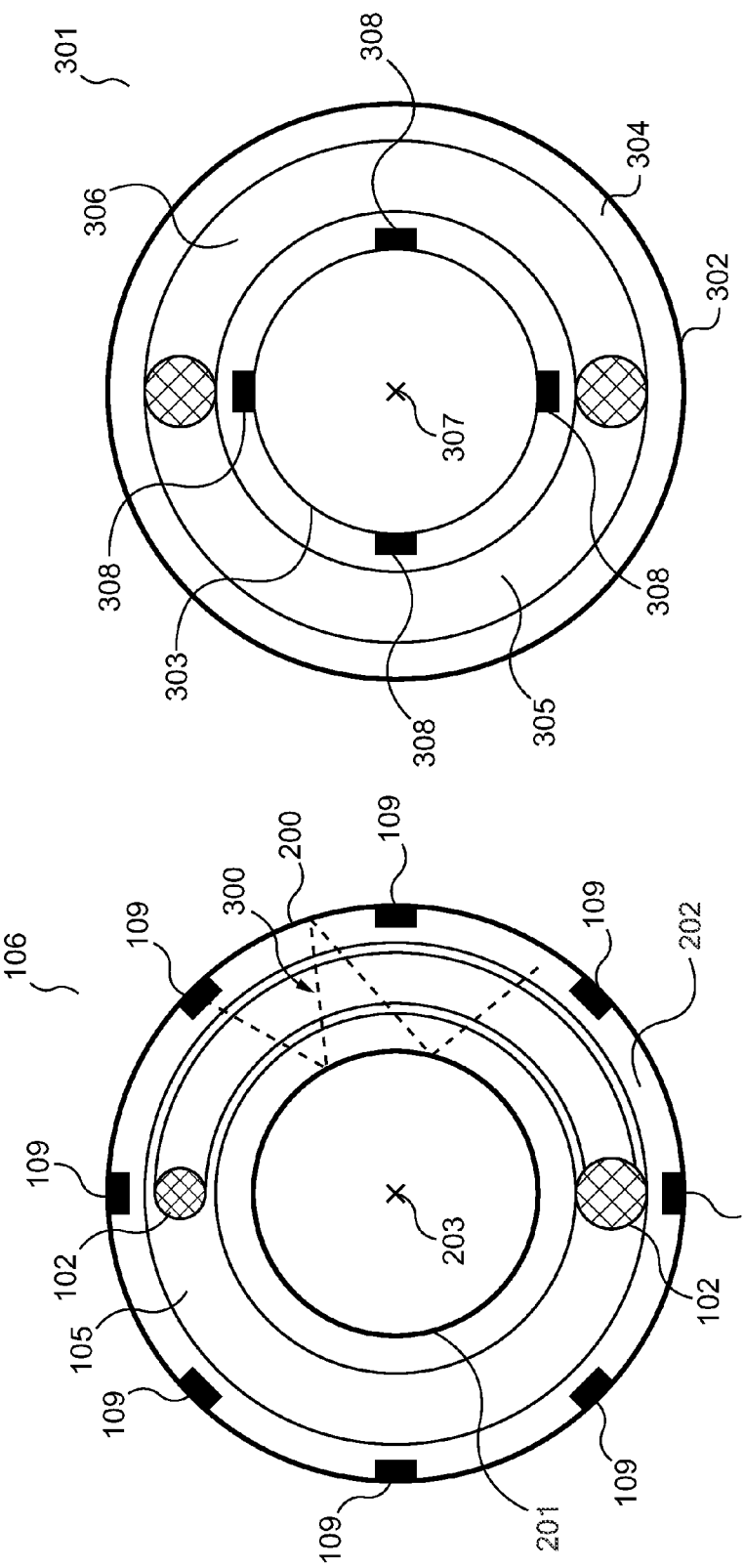
FIGS. 3A and 3B are transverse section views of the primary irradiation device of FIG. 2 and a primary irradiation device according to a second embodiment, respectively.

FIG. 3A depicts a transverse section view of the primary irradiation device of the first embodiment depicted in FIG. 2, as viewed from the section A-A. An exemplary beam 300 of ultraviolet light is depicted being emitted from a primary UV-LED 109. The beam 300 is reflected between the outer jacket 200 and core 201, passing through the first and second circulation tubes 105 and 115 several times to maximize the absorption of ultraviolet radiation by the liquid 102 disposed within the first and second circulation tubes 105 and 115.

FIG. 3B depicts a transverse section view of a primary irradiation device 301 according to a second embodiment. As in the first embodiment, there is provided an outer jacket 302 and a core 303, each of which are provided with a reflective surface and which together define the void space 304 in which a first and second circulation tube 305 and 306 of equal diameter are disposed about the longitudinal axis 307 in a double-helical arrangement. In this embodiment, the primary UV-LEDs 308 are disposed on the surface of the core 303. The uniform diameter of the first and second circulation tubes 305 and 306, and the reduced number of primary UV-LEDs 308 relative to the first embodiment, realizing a reduction in the cost of manufacturing the apparatus.

Figure 4:
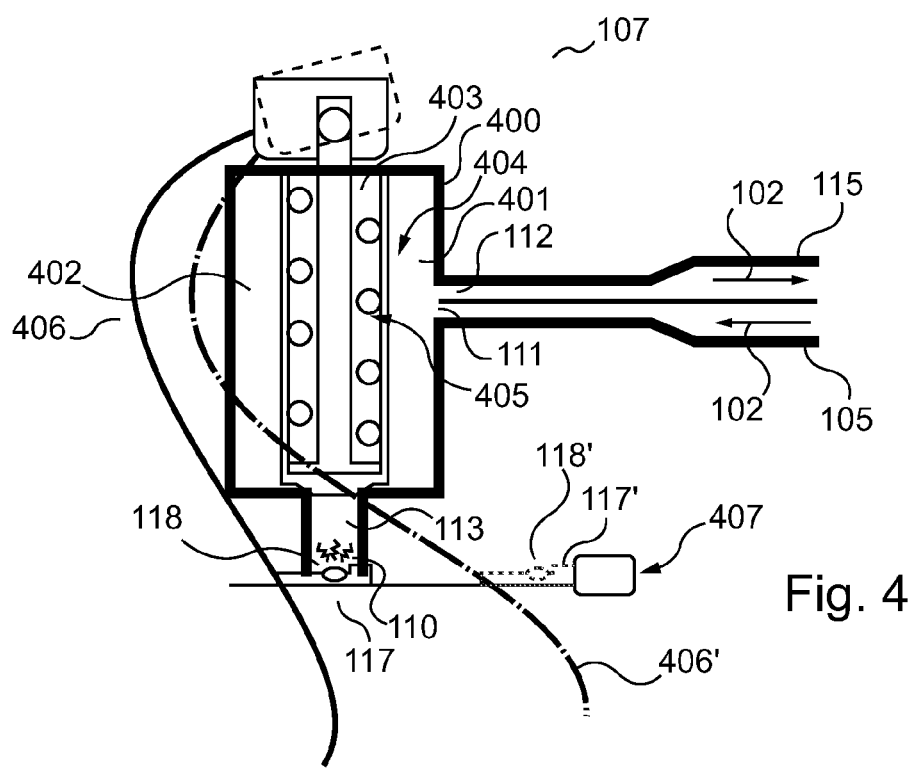
FIG. 4 is a section view of a directional valve, according to the first embodiment.

FIG. 4 depicts a section view of a directional valve 107 according to the first embodiment. The directional valve 107 comprises a cylindrical valve shell 400 which encloses the valve cavity 401. The first and second circulation tubes 105 and 115 are in fluid communication with the valve cavity 401 at the input and recirculation ports 111 and 112, respectively. When the directional valve 107 is closed, the liquid 102 will flow from the first circulation tube 105 through the input port 111 into the valve chamber 401, from where it exits via that recirculation port 112 and through the second circulation tube 115.

Within the directional valve 107 is disposed a valve body 402, comprised of a valve piston 403, a sealing boot 404, and a valve spring 405. The valve piston 403 is biased against the discharge port 113 by the valve spring 405. The sealing boot 404 serves both to facilitate the sealing of the discharge port 113 by the valve piston 403 and to protect the valve piston 403 and valve spring 405 from damage by infiltration of the liquid 102.

FIG. 4 further depicts the secondary irradiation means 117, disposed so as to project ultraviolet radiation 110 upon the discharge port 113. The directional valve 107 is operated by the valve lever 406, which is connected to both the valve body 402 and the secondary irradiation means 117. The valve lever and secondary irradiation means are here depicted in a recirculating position by the solid-line valve lever 406 and secondary irradiation means 117, and in a discharging position by the dashed-line valve lever 406' and secondary irradiation means 117'.

In the recirculating position, the secondary irradiation means 117 closes off the discharge port 113 and the secondary UV-LED 118 disposed upon it is activated, irradiating the portions of the discharge port 113 and valve body 402 past which the liquid 102 is not recirculated.

When the directional valve 107 is put into the discharging position, the valve lever 406' lifts the valve piston 403, retracting it from the discharge port 113 and permitting the liquid 102 to flow from the input port 111 to the discharge port 113. There is also provided a switch 407 which is disposed so as to be closed by the secondary irradiation means 117' when the directional valve is in the discharging position. The switch 407 is in communication with the control system of the apparatus which is ideally configured to turn off the secondary UV-LED 118 when it is no longer disposed to project upon the discharge port 113, thereby saving energy and preventing leakage of ultraviolet radiation from the apparatus.

Figure 5:
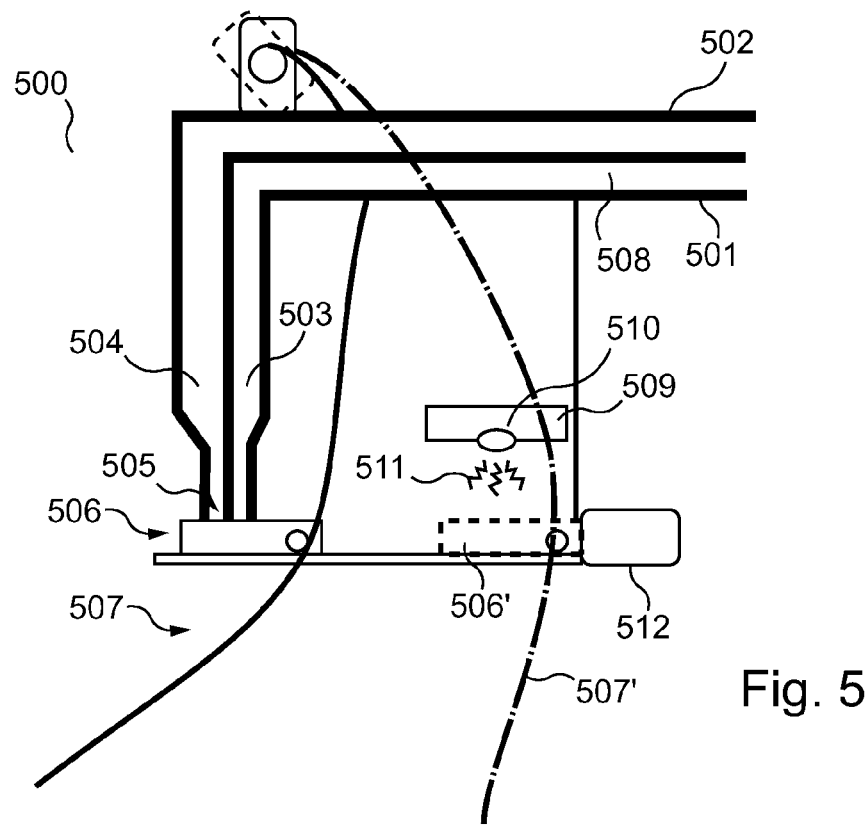
FIG. 5 is a section view of a directional valve, according to a third embodiment.

FIG. 5 is a section view of a directional valve 500 according to a third embodiment. The directional valve 500 comprises a first circulation tube 501 and a second circulation tube 502 which communicate with an input port 503 and a recirculation port 504, respectively. A discharge port 505 is also provided, which is sealed by a valve block 506 normally disposed to block fluid flow through said discharge port 505.

The valve block 506 is mobile with the valve lever 507. The valve lever and valve block are here depicted in two positions: the solid-line valve block 506 and valve lever 507 in a recirculating position, and the dashed-line valve block 506' and valve block 507' in a discharging position. During a discharging step, the valve lever 507' withdraws the valve block 506' from the discharge port 505, permitting the liquid 508 to flow from the first circulation tube 501 through the input port 503 and out the discharge port 505.

The apparatus is further provided with a secondary irradiation means 509, which comprises a secondary UV-LED 510 and which is disposed so as to project the ultraviolet radiation 511 upon the valve block 506'. The ultraviolet radiation 511 will disinfect the valve block 506', preventing any re-contamination of the liquid 508 when the valve block 506' is replaced in the recirculating position.

In a particular, non-limiting embodiment, the apparatus is also provided with a switch 512 which is closed when the valve block 507' is disposed in the discharging position, such that the secondary UV-LED 510 is only lit when the valve block is directly beneath it. This reduces the energy consumption of the secondary irradiation means 509 and, when combined with protective enclosures and the like, reduces the likelihood of a leakage of ultraviolet radiation.

Of course, the presently disclosed and/or claimed inventive concept(s) is not limited to the embodiments described above and in the accompanying drawings. Modifications remain possible, particularly as to the construction of the various elements or by substitution of technical equivalents, without thereby departing from the scope of protection of the presently disclosed and/or claimed inventive concept(s).

In particular, it should be understood that a liquid purification apparatus incorporating an embodiment the foregoing presently disclosed and/or claimed inventive concept(s) need not necessarily be a stand-alone unit dispensing liquid for immediate consumption as in a water fountain. The presently disclosed and/or claimed inventive concept(s) may instead be incorporated into a larger and/or different structure, e.g. a coffee machine or soda fountain; or in applications outside the scope of purifying liquids for consumption as a food or beverage, e.g. in cleaning or manufacturing inedible products.

The exact configuration and operation of the presently disclosed and/or claimed inventive concept(s) as practiced may thus vary from the foregoing description without departing from the inventive principle described therein. Accordingly, the scope of this disclosure is intended to be exemplary rather than limiting, and the scope of this presently disclosed and/or claimed inventive concept(s) is defined by any claims that stem at least in part from it.

The invention claimed is:

1. A liquid purification apparatus, comprising:
    a reservoir configured to accommodate a volume of liquid;
    a pump disposed in fluid communication with said reservoir; and
    a primary irradiation device, said primary irradiation device being provided with ultraviolet light emitting means;
    a directional valve, said directional valve comprising an input port, a recirculation port, a discharge port, and a sealing means, said directional valve being mobile between a recirculating position wherein said sealing means blocks said discharge port and a discharging position wherein said directional valve permits a flow from said input port through said discharge port and out of the liquid purification apparatus;
    a first circulation tube, wherein the first circulation tube extends from the pump through the primary irradiation device to the directional valve, said first circulation tube establishing fluid communication between said pump and said input port of said directional valve; and
    a second circulation tube, wherein the second circulation tube extends from the directional valve through the primary irradiation device to the reservoir, said second circulation tube establishing fluid communication between said recirculation port of said directional valve and said reservoir;
    wherein when said directional valve is in the recirculating position, said reservoir, pump, first circulation tube, directional valve, and second circulation tube form a closed loop whereby liquid is irradiated by the primary irradiation device as it circulates both to the directional valve via the first circulation tube and from the directional valve via the second circulation tube; and
    wherein when said directional valve is in the discharging position, liquid flows from said reservoir through said pump, first circulation tube, primary irradiation device, and directional valve and out of the liquid purification apparatus through the discharge port of said directional valve; and
    wherein each of the first circulation tube and the second circulation tube comprises a portion transparent to ultraviolet light, and wherein both transparent portions of the first and second circulation tubes are disposed within the primary irradiation device.

2. The liquid purification apparatus of claim 1, wherein the ultraviolet light emitting means of the primary irradiation device comprises a plurality of ultraviolet light emitting diodes.

3. The liquid purification apparatus of claim 1, further comprising a secondary irradiation device provided with at least one ultraviolet light-emitting diode which projects upon at least part of said directional valve.

4. The liquid purification apparatus of claim 3, wherein said secondary irradiation device projects upon said discharge port of said directional valve.

5. The liquid purification apparatus of claim 3, wherein said secondary irradiation device projects upon said sealing means.

6. The liquid purification apparatus of claim 1, wherein the transparent portion of the first circulation tube and the transparent portion of the second circulation tube disposed within said primary irradiation device are configured in a double helix.

7. The liquid purification apparatus of claim 1, wherein said first and second circulation tubes have different diameters.

8. The liquid purification apparatus of claim 1, wherein said primary irradiation device comprises a substantially cylindrical core disposed concentrically within a substantially tubular jacket, wherein the portion of the first circulation tube and/or the portion of the second circulation tube that is disposed within the primary irradiation device is disposed between said core and said jacket.

9. The liquid purification apparatus of claim 8, wherein the ultraviolet light emitting means of the primary irradiation device comprises a plurality of ultraviolet light emitting diodes, wherein the substantially cylindrical core is configured as a reflector, and wherein the plurality of ultraviolet light-emitting diodes are disposed upon an internal surface of said jacket.

10. The liquid purification apparatus of claim 8, wherein an internal surface of said jacket is configured as a reflector and a plurality of ultraviolet light-emitting diodes are disposed upon said core.

11. The liquid purification apparatus claim 1, wherein said first and second circulation tubes are at least partially fabricated from fused silica.

12. The liquid purification apparatus claim 1, wherein said primary irradiation device comprises a photosensor.

13. The liquid purification apparatus claim 1, further comprising a check valve disposed in said second circulation tube, said check valve preventing the flow of liquid from said reservoir to said directional valve through said second circulation tube.

14. A beverage dispenser comprising:
a liquid purification comprising:
  a reservoir configured to accommodate a volume of liquid;
  a pump disposed in fluid communication with said reservoir; and
  a primary irradiation device, said primary irradiation device being provided with ultraviolet light emitting means;
  a directional valve, said directional valve comprising an input port, a recirculation port, a discharge port, and a sealing means, said directional valve being mobile between a recirculating position wherein said sealing means blocks said discharge port and a discharging position wherein said directional valve permits a flow from said input port through said discharge port and out of the liquid purification apparatus;
  a first circulation tube, wherein the first circulation tube extends from the pump through the primary irradiation device to the directional valve, said first circulation tube establishing fluid communication between said pump and said input port of said directional valve; and
  a second circulation tube, wherein the second circulation tube extends from the directional valve through the primary irradiation device to the reservoir, said second circulation tube establishing fluid communication between said recirculation port of said directional valve and said reservoir;
wherein when said directional valve is in the recirculating position, said reservoir, pump, first circulation tube, directional valve, and second circulation tube form a closed loop whereby liquid is irradiated by the primary irradiation device as it circulates both to the directional valve via the first circulation tube and from the directional valve via the second circulation tube; and
wherein when said directional valve is in the discharging position, liquid flows from said reservoir through said pump, first circulation tube, primary irradiation device, and directional valve and out of the liquid purification apparatus through the discharge port of said directional valve; and
wherein each of the first circulation tube and the second circulation tube comprises a portion transparent to ultraviolet light, and wherein both transparent portions of the first and second circulation tubes are disposed within the primary irradiation device.

15. A method for purifying a volume of liquid with a liquid purification apparatus comprising a reservoir configured to accommodate a volume of liquid and a directional valve comprising an input port, a recirculation port, a discharge port, and a sealing means, the directional valve being mobile between a recirculating position wherein said sealing means blocks a discharge port, and a discharging position wherein said directional valve permits a flow from said input port through said discharge port and out of the liquid purification apparatus, the method comprising the steps of:
drawing said volume of liquid from said reservoir by a pump and conducting it to said directional valve through a first circulation tube extending from the pump through a primary irradiation device to the directional valve and establishing fluid communication between said pump and said input port of said directional valve;
conducting said volume of liquid to said reservoir through a second circulation tube extending from the directional valve through the primary irradiation device to the reservoir and establishing fluid communication between said recirculation port of said directional valve and said reservoir;
a portion of each of the first circulation tube and the second circulation tube being transparent to ultraviolet light and being disposed within the primary irradiation device comprising ultraviolet light emitting means, the liquid being thus irradiated by the primary irradiation device as it circulates both to the directional valve via the first circulation tube and from the directional valve via the second circulation tube;
maintaining said directional valve in said recirculating position such that said volume of liquid is sequentially recirculated along a closed loop comprising the reservoir, the pump, the first circulation tube, the directional valve, and the second circulation tube until a discharging step; and discharging said liquid from said discharge port by disposing said directional valve in said discharging position such that said liquid flows from said reservoir through said pump, first circulation tube, primary irradiation device, and directional valve and out of the liquid purification apparatus through the discharge port of said directional valve.

16. The method of claim 15, characterized in that said volume of liquid is continuously recirculated through said liquid purification apparatus.

17. The method of claim 15, characterized in that said volume of liquid is periodically recirculated through said liquid purification apparatus for a finite duration of recirculation.

18. The method of claim 15, further characterized in that there is provided a secondary irradiation device comprising at least one ultraviolet light-emitting diode projecting upon at least part of said directional valve, and in that during said discharging step said secondary irradiation device irradiates part of said directional valve.

19. The method of claim 15, further characterized in that there is provided a secondary irradiation device comprising at least one ultraviolet light-emitting diode projecting upon at least part of said directional valve, and in that during said maintaining step said secondary irradiation device irradiates part of said directional valve.

20. The method of claim 15, wherein the light emitting means of the primary irradiation device comprises ultraviolet light emitting diodes.

* * * * *